United States Patent
Scribner

[15] 3,681,338
[45] Aug. 1, 1972

[54] C-21 LOWER ALKYSULFINYL ESTERS OF CERTAIN 6α-FLUORO-21-HYDROXYCORTICOSTEROIDS

[72] Inventor: Richard M. Scribner, Wilmington, Del.

[73] Assignee: E. I. du Pont de Nemours and Company, Wilmington, Del.

[22] Filed: April 22, 1970

[21] Appl. No.: 31,005

[52] U.S. Cl...260/239.55 D, 260/397.45, 260/239.5, 424/243

[51] Int. Cl............................................C07c 173/00

[58] Field of Search......./Machine Searched Steroids

Primary Examiner—Elbert L. Roberts
Attorney—James H. Ryan

[57] ABSTRACT

C–21 Lower alkylsulfinyl esters of certain 6α-fluoro-21-hydroxycorticosteroids are good antiinflammatory agents which have both topical and systemic activities. These compounds are best prepared by a two-step process which involves the esterification of a 21-hydroxycorticosteroid with a lower alkylsulfide-acid and oxidation of the resulting sulfide ester with a mild oxidizing agent to the corresponding sulfinyl ester.

12 Claims, No Drawings

C-21 LOWER ALKYSULFINYL ESTERS OF CERTAIN 6α-FLUORO-21-HYDROXYCORTICOSTEROIDS

BACKGROUND OF THE INVENTION

1. Field of the Invention

This invention is directed to lower alkylsulfinyl esters of certain 6α-fluoro-21-hydroxycorticosteroids.

2. Prior Art

Many natural or synthetic corticosteroids have valuable antiinflammatory properties and are useful as topical and systemic antiinflammatory agents. However, it is generally recognized that a need exists for antiinflammatory agents which show yet greater efficacy and/or diminished side effects.

The potent skin-penetrating properties of dimethyl sulfoxide (DMSO) have been recognized during the past few years, and this substance has been used experimentally as a solvent to enhance skin penetration of a number of biologically active materials. The great penetration of DMSO through the skin is probably related to both the dipolar character of the sulfoxide group and its hydrophilic character. DMSO, however, is not a practical solvent for drugs because it sometimes has undesirable side effects and causes skin irritation when applied in large amounts. Chemical modification of a biologically active material by increasing its polar character and/or hydrophilic properties would appear to offer a good possibility of improving its penetration through the skin or gastrointestinal tract while at the same time favorably altering its distribution between the aqueous and liquid phases of the body. However, this approach often fails because the chemical modification alters the biological properties of the material and makes it unsuitable for the intended use.

There have been in the past no reported attempts either to increase the penetration, potency, or duration of activity or to reduce the side effects of corticosteroid compounds useful as antiinflammatory agents by esterifying a steroid alcohol with alkylsulfinylcarboxylic acid.

SUMMARY OF THE INVENTION

According to this invention, it has now been discovered that lower alkylsulfinyl esters of certain 6α-fluoro-21-hydroxycorticosteroids have good antiinflammatory activity and are suitable for both topical and systemic use.

Although the term "corticosteroid" is well known to the art, it has been variously used to designate the origin, the chemical structure, or the biological activity of certain steroids. The compounds contemplated by the present invention are C—21 esters of 21-hydroxy-20-ketopregnanes having at least one fluorine in the 6-position. These compounds also have the characteristic Δ⁴-3-ketostructure and preferably an oxygenated functional group at C-11. Other substituents, especially lower alkyl, hydroxy, and halogen, can be present, as shown below.

The compounds of the present invention can be represented by the following Formula 1, in which the methyl groups at C—10 and C—13 are indicated by vertical lines.

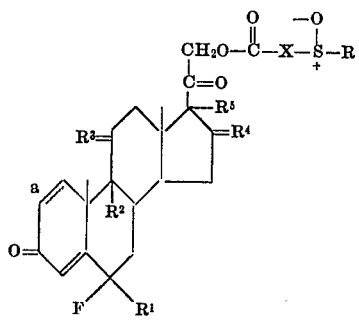

(1)

in which $a$ is a single bond or a double bond; $R^1$ is hydrogen or fluorine; $R^2$ is hydrogen, chlorine, or fluorine; $R^3$ is oxygen, one α-hydrogen and one β-hydroxyl, or one α-hydrogen and one β-chlorine; $R^4$ is two hydrogens, one hydrogen and methyl, one hydrogen and one hydroxyl, or one hydrogen and one acetoxyl; $R^5$ is hydroxyl; $R^4$ and $R^5$ together can form the group

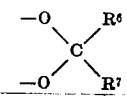

in which each of $R^6$ and $R^7$ can independently be an alkyl of one to six carbon atoms, a cycloalkyl of five to six carbon atoms, or phenyl; or $R^6$ and $R^7$ together are an alkylene of four to five carbon atoms; X is a divalent hydrocarbon radical of up to ten carbon atoms; and R is an alkyl of one to four carbon atoms.

X and R together can form a cyclic structure, e.g. as shown in Formula 2, below, showing the D ring.

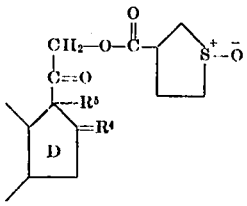

(2)

The new esters of the present invention are conveniently prepared by a two-step process involving the esterification of the C—21 hydroxyl with the appropriate sulfide-acid, followed by mild oxidation of the sulfide to the sulfoxide.

DETAILED DESCRIPTION OF THE INVENTION

6α-Fluoro-21-hydroxycorticosteroids can be converted to their 21-alkylsulfinyl esters. Representative starting steroids are shown in Table I, below.

TABLE I

6α-fluoro-11β,17α, 21-trihydroxy-4-pregnene-3,20-dione;

6α-fluoro-17α, 21-dihydroxy-4-pregnene-3,11,20-trione;

6α-fluoro-11β, 17α, 21-trihydroxy-1,4-pregnadiene-3,20-dione;

6α-fluoro-17α,21-dihydroxy-1,4-pregnadiene-3,11,20-trione;

6α-fluoro-11β,16α,17α,21-tetrahydroxy-1,4-pregnadiene-3,20-dions;

6α-fluoro-11β,16α,17α,21-tetrahydroxy-4-pregnene-3,20-dione;

6α-fluoro-11β,16α,17α,21-tetrahydroxy-4-pregnene-3,20-dione 16,17-acetonide;

6α-fluoro-16α-methyl-11β,17α,21-trihydroxy-1,4-pregnadiene-3,20-dione;
6α-fluoro-16α-methyl-17α,21-dihydroxy-1,4-pregnadiene-3,11,20-trione;
6α,9α-difluoro-16α-methyl-11β,17α,21-trihydroxy-1,4-pregnadiene-3,20-dione;
6α,9α-difluoro-16β-methyl-11β,17α,21trihydroxy-1,4-pregnadiene-3,20-dione;
6α,9α-difluoro-11β,16α,17α,21-tetrahydroxy-1,4-pregnadiene-3,20-dione 16,17-acetonide;
6αα-difluoro-11β,16α,17α,21-tetrahydroxy-1,4-pregnadiene-3,20-dione;
6,6-difluoro-11β,17α,21-trihydroxy-1,4-pregnadiene-3,20-dione;
6,6-difluoro-17α,21-dihydroxy-1,4-pregnadiene-3,11,20-trione;
6,6-difluoro-17α,21-dihydroxy-4-pregnene-3,11,20-trione;
6,6-difluoro-16α,17α, 21-trihydroxy-4-pregnene-3,20-dione;
6,6-difluoro-16α,17α,21-trihydroxy-4-pregnene-3,20-dione 16,17-acetonide;
6,6-difluoro-16α-methyl-17α,21-dihydroxy-4-pregnene-3,20-dione;
6,6-difluoro-11β,17α,21-trihydroxy-4-pregnene-3,20-dione (6,6-difluorocortisol);
6,6-difluoro-16α-methyl-11β,17α,21-trihydroxy-1,4-pregnadiene-3,20-dione;
6,6-difluoro-16β-methyl-11β,17α,21-trihydroxy-1,4-pregnadiene-3,20-dione;
6,6-difluoro-11β,16α,17α,21-tetrahydroxy-1,4-pregnadiene-3,20-dione 16,17-acetonide;
6,6-difluoro-11β,16α,17α,21-tetrahydroxy-4-pregnene-3,20-dione 16,17-acetonide;
6,69α-trifluoro-11β,16α,17α,21 -tetrahydroxy-1,4-pregnadiene-3,20-dione 16,17-acetonide;
6,69α-trifluoro-16α-methyl-11β,17α,21-trihydroxy-1,4-pregnadiene-3,20-dione;
6,6,9α-trifluoro-16β,17α,21-trihydroxy-1,4-pregnadiene 3,20-dione;
6,6,9α-trifluoro-11β,17α,21-trihydroxy-4-pregnene-3,20-dione;
6,6,9α-trifluoro-11β,16,17α,21-tetrahydroxy-1,4-pregnadiene-3,20-dione 16,17-acetophenonide; and
6,6,9α-trifluoro-11β,16, 17α,21-tetrahydroxy-1,4-pregnadiene-3,20-dione 16,17-cyclohexanonide.

Most of the above and similar starting materials are known, and some are commercially available. Certain other steroids, such as e.g., 6,6-difluorocortisol, have not been reported but can be made by known processes from known starting materials. Difluorocortisol, thus can be made in eight steps from 17α,20; 20,21-trimethylenedioxy-3-acetoxy-3,5-pregnadiene-11-one, which is a known compound [J. H. Fried, A. N. Nutile, and G. E. Arth, J. Org. Chem. Soc. 26 976 (1961)]. The reaction sequence includes the steps of addition of nitrosyl fluoride to the sodium borohydride reduction product of the 3,5-pregnadiene starting material, conversion of the intermediate with $Al_2O_3$ to the 5α-fluoro-6-keto compound, reaction of the latter with sulfur tetrafluoride to give the corresponding 5α,6,6-trifluorosteroid, hydrolysis of the 3-acetyl group and oxidation to the 3-ketone, followed by dehydrofluorination to the 6,6-difluoro-4-pregnene derivative, reduction of the 11-ketone to the 11β-hydroxyl (having first protected the 3-keto group), and hydrolysis of the bismethylenedioxy group.

Other 6α-fluorocorticosteroids which have not been previously reported or are not readily available can be made by methods known to skilled chemists having understanding of steroid reactions. (See, for example, C. Djerassi, "Steroid Reactions", Holden-Day, San Francisco, 1963, Chap. 3). Virtually all of the corticosteroid compounds comprised within the scope of the present invention can be made by several alternative routes. The choice will depend on the starting materials available as well as on the overall economics. Certain syntheses can involve the use of both chemical and microbiological techniques. Thus, the 11β-hydroxy group often can be introduced through a technique using the microorganism Curvularia lunata.

While Table I shows some possible corticosteroids in the form of their 16,17-acetonide, acetophenonide, and cyclohexanonide derivatives, other ketal derivatives also can be used. In these compounds, each of $R^6$ and $R^7$ can be any one of the following representative radicals: methyl, ethyl, propyl, isopropyl, butyl, pentyl, hexyl, cyclopentyl, cyclohexyl, or phenyl; and $R^6$ together with $R^7$ can be tetramethylene or pentamethylene. Such ketals are readily obtained from the 16α,17β-dihydroxysteroids and appropriate ketones in the presence of an acidic catalyst, such as perchloric acid.

The alkylsulfinyl acid portion of the 6α-fluoro-corticosteroid ester can have a variety of possible structures. The divalent hydrocarbon radical, designated as X in Formula 1, can be alkylene, arylene, alkarylene, or aralkylene. Suitable X hydrocarbon radicals include those listed in Table II.

TABLE II methylene
ethylene
1,3-propylene
1,2-propylene
1,4-butylene
2,3-butylene
1,2-butylene
1,5-pentylene
2,2-dimethyl-1,3propylene
1,6-hexylene
2,2-dimethyl-1,4-butylene
b 1,7-heptylene
1,10-decylene
2,2,4,4-tetramethylhexylene
p-phenylene
o-phenylene
m-phenylene
1,4-naphthylene
1,8-naphthylene
α,4-tolylene
α,3-tolylene
α,α'-1,4-xylene and
4-ethyl-2,5-tolylene The lower alkyl radical, designated as R in Formula 1, can be methyl, ethyl, propyl, isopropyl, butyl, isobutyl, sec-butyl or t-butyl. As mentioned earlier, R and X can be joined together to form cyclic structures, some of which are shown below:

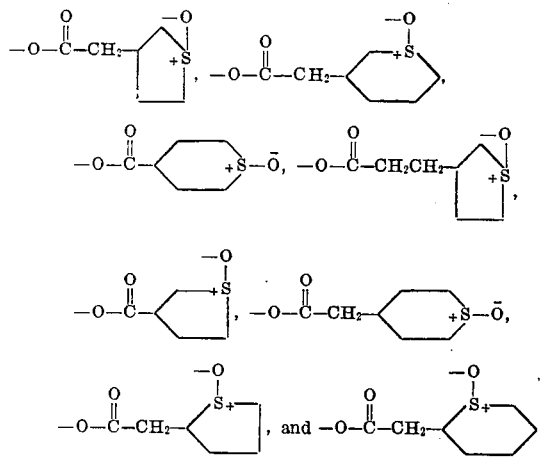

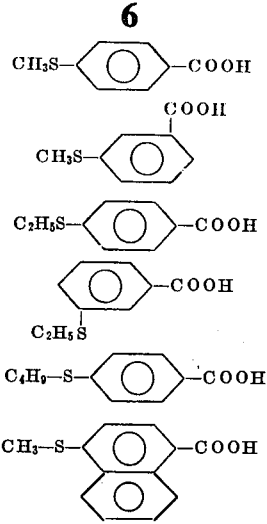

and

Lower alkylsulfinyl acids can be readily prepared by oxidation of the corresponding sulfide-acids with a mild oxidizing agent, such as an organic peroxyacid or hydrogen peroxide. The reaction sometimes also gives varying amounts of sulfones, which are undesirable by-products. The sulfones can be removed by several techniques, including thin layer or column chromatography, distillation, crystallization, or filtration.

It has been found, however, that esterification of a 6α-fluoro-21-hydroxycorticosteroid with either a free alkylsulfinyl acid or an alkylsulfinyl acid chloride is impractical and results at best in low yields of the desired products. Pummerer rearrangement is one of the important side reactions. The preferred process for the preparation of novel esters of the present invention is the esterification of a 6α-fluoro-21-hydroxycorticosteroid with a sulfide-acid, followed by oxidation of the sulfide to the sulfoxide.

Many starting sulfide-acids are readily available, but all of them can be made by conventional reactions. A simple way to make a sulfide-acid involves a reaction of the sodium salt of a halogen acid with a mercaptan in alkaline medium. This and other synthetic techniques are described in Chapter 3 of "Organic Sulfur Chemistry" Vol. III, by E. E. Reid (Chemical Publishing Co., New York, 1960).

Known sulfide-acids include the following representative compounds, tabulated below. They have the formula

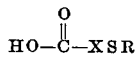

where X and R are as previously defined.

TABLE III

CH$_3$SCH$_2$COOH
C$_2$H$_5$SCH$_2$COOH
C$_3$H$_7$SCH$_2$COOH (both normal and iso)
C$_4$H$_9$SCH$_2$COOH (normal, iso, secondary, and tertiary)
CH$_3$SCH(CH$_3$)COOH
C$_2$H$_5$SCH(CH$_3$)COOH
C$_3$H$_7$SCH(CH$_3$)COOH (both normal and iso)
C$_4$H$_9$SCH(CH$_3$)COOH (normal and tertiary)
CH$_3$SCH(C$_2$H$_5$)COOH
C$_4$H$_9$SCH(C$_2$H$_5$)COOH (normal)
C$_2$H$_5$SC(CH$_3$)$_2$COOH
C$_3$H$_7$SCH$_2$CH$_2$COOH (normal)
C$_3$H$_7$SCH$_2$CH$_2$CH$_2$COOH (normal)

Other sulfide-acids can be prepared by the conventional synthetic methods of organic chemistry. For example, 1,5-dihydroxypentane-3-carboxylic acid, which can be prepared from diethyl malonate and ethylene oxide, can be converted to 1,5-dibromopentane-3-carboxylic acid (e.g. by treatment with triphenylphosphine dibromide and then water); this compound on treatment with sodium sulfide gives 4-thiacyclohexane-1-carboxylic acid. Thiacyclopentanecarboxylic acids can be prepared by palladium catalyzed reduction of the corresponding thiophenecarboxylic acids.

The first step of the process, the esterification with a sulfide-acid, is most conveniently accomplished by contacting under controlled conditions a sulfide-acid chloride with a 6α-fluoro-21-hydroxycorticosteroid. The 17α-hydroxy and the 11β-hydroxy groups are less reactive than the 21-hydroxy group and usually do not require protection. The reaction can be carried out under nitrogen at a temperature of about −30° to +30° C. in an inert solvent, such as a chlorinated hydrocarbon, or an ether. Suitable solvents include chloroform, tetrahydrofuran, or dioxane. Usually, a proton acceptor also is present in the solution. This generally is a tertiary amine, such as pyridine, triethylamine, trimethylamine, N,N-dimethylaniline, and N-methyl morpholine. Preferably, the amine itself, especially pyridine, serves as the reaction solvent and is, therefore, used in a large excess. The sulfide-acid chloride, on the other hand, preferably is used in about a stoichiometric proportion.

The acid chloride is added gradually either neat or in a solution in the same or a different inert solvent with good stirring. After addition of the acid chloride the solution is stirred for an additional period of a few hours to several days. The sulfide-acid ester is recovered by any conventional technique, such as, for example, extraction with an appropriate solvent after dilution of the reaction mixture with water. The crude ester can be purified by chromatography and/or recrystallization.

Instead of the acid chloride, the appropriate sulfide-acid anhydride or mixed anhydride can be used. The reaction usually is carried out at a temperature of about −30° to +30° C. Tertiary amines, such as pyridine, catalyze the reaction, which can also be carried out in pyridine solution. These esters can also be prepared by reaction of salts of sulfideacids with corticoid 21-sulfonate esters.

The sulfide-acid ester formed in the first step is oxidized to the corresponding alkylsulfinyl ester by contacting the former with a mild oxidant, such as a peroxy compound, oxides of nitrogen, sodium bromate, or a periodate. Hydrogen peroxide or peroxyacids can be used in this step, including perbenzoic acid, peracetic acid, or m-chloroperbenzoic acid.

In order to minimize the possibility of the formation of undesirable by-products, such as sulfoxides, the oxidation step is carried out at a low temperature, preferably within the range of −20° to 25° C., and a stoichiometric amount of the peroxy compound is used. Neighboring 16α- and 17α-hydroxy groups can be protected by the formation of an acetonide, which can later be split in a weakly acid medium if desired.

While a large number of lower alkylsulfinyl esters of 6α-fluoro-21-hydroxycorticosteroids can be made, the 2,2-dimethyl-3-methylsulfinylpropionate esters appear to offer a particularly well-balanced combination of steric hindrance toward hydrolysis and of lipophilic and hydrophilic properties. Since neither the starting 2,2-dimethyl-3-methylthiopropionyl chloride nor its precursor, 2,2-dimethyl-3-methylthiopropionic acid have been heretofore reported, their preparation is described below in Example A. Temperatures are in degrees centigrade.

EXAMPLE A

2,2-Dimethyl-3-methylthiopropionyl chloride

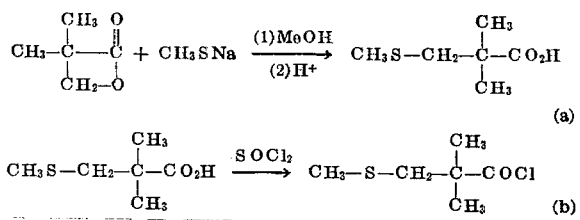

a. Methylmercaptan, 30 g. (0.60 mole), is bubbled into a cold solution of 27 g. (0.50 mole) of sodium methoxide in 150 ml. of dry methanol. To this solution cooled in an ice bath is then added 50 g. (0.50 mole) of pivalolactone dropwise at a rate adjusted to keep the temperature of the reaction mixture at about 15°. After stirring for 1 hour at room temperature, the reaction mixture is diluted with about 300 ml. of ether and then poured into 500 ml. of ice water. The ether layer is drawn off in a separating funnel, and the aqueous layer is extracted a second time with fresh ether. The aqueous layer is then acidified with 45 ml. of conc. HCl, extracted with ether twice, and this ether extract is washed with water once, dried over $Na_2SO_4$ and evaporated in vacuo, to give a liquid which is distilled through an 18 inch spinning band column. The distillation gives 45 g. (62 percent yield) of pure 2,2-dimethyl-3-methylthio-propionic acid, b.p. 79°/0.2 mm.

Anal. Calcd. for $C_6H_{12}SO_2$: C, 48.64; H, 8.16; S, 21.6;

Found: C, 48.48; H, 7.93; S, 21.72; nmr ($CDCl_3$—TMSi), Hz at 60 MHz: 743 (s, 1, $CO_2H$); 165 (s, 2, S—$CH_2$); 128 (s, 3, $CH_3S$—), 77 [s, 6, $C(CH_3)_2$]; IR ($CHCl_3$); 3.34, 3.42 (C—H), 3–4 μ $CO_2H$, 5.85 ($CO_2H$), 7.21, 7.32 [$C(CH_3)_2$].

b. A solution of 3-methylthio-2,2-dimethylpropionic acid in benzene is treated with excess thionyl chloride and 1 drop of dimethylformamide. After 30 min. the reaction mixture is heated at reflux temperature for 1 hr. and distilled to give 3-methyl-2,2-dimethylpropionyl chloride, b.p. about 35°/0.2 mm.

The invention is now illustrated by representative examples of certain preferred embodiments thereof. All temperatures are in degrees centigrade.

PREFERRED EMBODIMENTS

EXAMPLE 1

6,6-Difluoro-16α-Methyl-11β,17α,21-trihydroxy-1,4-Pregnadiene-3,20-dione 21-(3′-methylsulfinylpropionate)

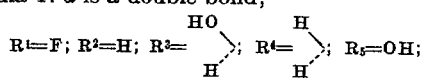

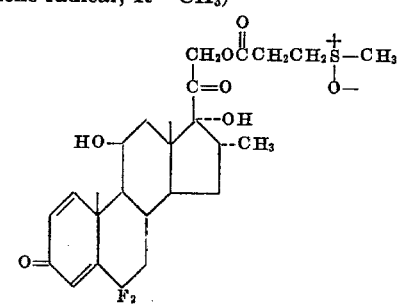

a. To a solution of 400 mg. (1 mmole) of 6,6-difluoro-16α-methyl-11β,17α,21-trihydroxy-1,4-pregnadiene-3,20-dione in 5 ml. of pyridine under nitrogen, there is added 450 mg. (3mmoles) of 3-methylthiopropionyl chloride. The reaction mixture is stirred at room temperature for 3 days. It is then poured into water, extracted into ethyl acetate, washed with 5 percent aqueous HCl and with 5 percent sodium bicarbonate, and dried over $Na_2SO_4$. Evaporation of the organic solvent and chromatography of residue on silica gel gives 494 mg. of 6,6-difluoro-16α-methyl-11β,17α,21-trihydroxy-1,4-pregnadiene-3,20-dione 21-(3′-methylsulfinylpropionate) isolated as a glass.

b. A solution of 300 mg. (0.59 mmole) of the methylthioester in 25 ml. of methylene chloride is cooled in ice and stirred, while a solution of 118 mg. (0.59 mmole, 85 percent assay) in 2 ml. of methylene chloride is added dropwise. The solution is stirred for one hr. with continued cooling and then at room temperature overnight. The reaction mixture is extracted once with 10 ml. of saturated sodium bicarbonate solution, dried over $Na_2SO_4$, and evaporated in vacuo. Preparative thin layer chromatography of the residue using 1:2 benzene-acetone as the developing solvent gives 6,6-difluoro-16α-methyl-11β,17α,21-trihydroxy-1,4-pregnadiene-3,20-dione 21-(3′-methylsulfinylpropionate), m.p. 123°–128° (from acetone-benzene); mass spectrum (70 ev); calc'd. for $C_{25}H_{30}F_2O_6$ (M—$CH_3SOH$): 464.2010, found 464.2001; calc'd. for $CH_3SOH$: 63.9983, found 63.9987; calc'd. for $C_{20}H_{25}F_2O_3$ (M—$COCH_2OCOCH_2$—$CH_3SOCH_3$); 351.1771, found 351.1768.

EXAMPLE 2

6α-Fluoro-11β,17α,21-tetrahydroxy-4-Pregnene-3,20-dione 16,17-acetonide 21-(2′,2′-dimethyl-3′-methylsulfinylpropionate)

(Formula 1: a is a single bond;

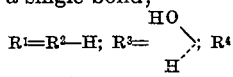

R¹=R²=H; R³=

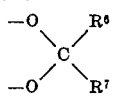

and R⁵ together form the

—O    R⁶
   \\C/
—O/   \\R⁷ group, where R⁶=R⁷=CH₃; X is the 2-methyl-1,2-propylene radical; R=CH₃)

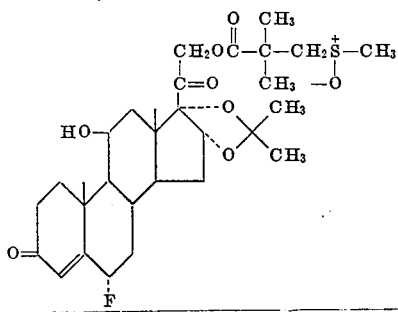

a. By a procedure analogous to Example 1, part (a) 6α-fluoro-11β,17α,17α,21-tetrahydroxy-4-pregnene-3,20-dione 16,17-acetonide 21-(2',2'-dimethyl-3'-methylthiopropionate) is prepared from 6α-fluoro-11β,16α,17α-tetrahydroxy-4-pregnene-3,20-dione 16,17-acetonide and the acid chloride from Example A. The ester melts at 198.5°–199.5° (from methanol); mass spectrum (70 ev) calcd. for $C_{30}H_{43}FSO_7$: 566.2714, found 566.2755.

b. By a procedure analogous to Example 1, part (b), 6α-fluoro-11β,16α,17α,21-tetrahydroxy-4-pregnene-3,20-dione 16,17-acetonide 21-(2',2'-dimethyl-3'-methylsulfinylthiopropionate) is prepared from the methylthioester. The ester melts at 125°–127° (from methanol-water); mass spectrum (70 ev) calcd. for $C_{30}H_{43}FSO_8$: 582.2662, found 582.2677; H nmr (CDCl₃—TMSi) Hz at 60 MHz (3), 71 (3), 86, 85, 91 (12 total), 158 (3), 181 (2).

EXAMPLE 3

6αFluoro-11β,16α,17α,21-tetrahydroxy-4-pregnene-3,20-dione 16,17-acetonide 21-(3'-methylsulfinylpropionate)

(Formula 1: a is a single bond

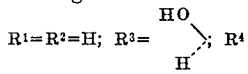

R¹=R²=H; R³=

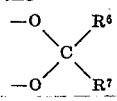

and R⁵ together form the

—O    R⁶
   \\C/
—O/   \\R⁷ group, where R⁶=R⁷=CH₃; X is the ethylene radical; R=CH₃)

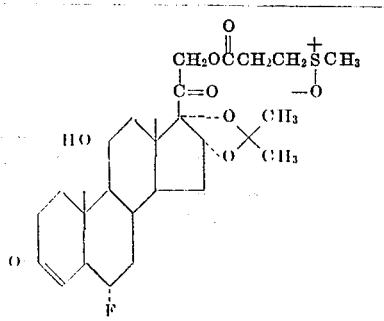

a. By a procedure analogous to Example 1, part (a) 6α-fluoro-11β,16α,17α,21-tetrahydroxy-4-pregnene-3,20-dione 16,17-acetonide is treated with 3-methylthiopropionyl chloride, giving the corresponding methylthioester.

b. By a procedure analogous to Example 1, part (b), the methylthioester is oxidized to 6α-fluoro-11β,16α,17α-tetrahydroxy-4-pregnene-3,20-dione 16,17-acetonide 21-(3'-methyl-sulfinylpropionate), m.p. 132°–135° (from ethanol-water); mass spectrum m/e 490 (M—CH₃—SOH), 377 (M—COCH₂OCDCH₂CH₂SOCH₃), 64 (CH₃SOH).

EXAMPLE 4

6,6,9α-Trifluoro-16α-methyl-11β,17α,21-trihydroxy-1,4-pregna-diene-3,20-dione 21-(2',2'-dimethyl-3'-methylsulfinylpropionate)

(Formula 1: a is a double bond;

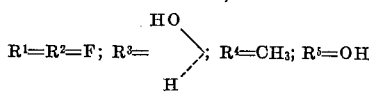

R¹=R²=F; R³=    ; R⁴=CH₃; R⁵=OH

X is the 2-methyl-1,2-propylene radical; R=CH₃)

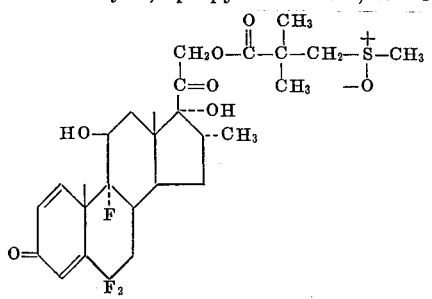

a. By a procedure analogous to Example 1, part (a), 6,6,9α-trifluoro-16α-methyl-11β,17α,21-trihydroxy-1,4-pregnadiene-3,20-dione is treated with the acid chloride from Example A, giving the corresponding methylthioester, m.p. 175°–176° (isopropyl alcohol); mass spectrum calcd. for $C_{28}H_{37}F_3SO_7$: 558.2263, found 558.2319.

b. By a procedure analogous to Example 1, part (b), the methylthioester is oxidized to 6,6,9α-trifluoro-16α-methyl-11β,17α,21-trihydroxy-1,4-pregnadiene-3,20-dione 21-(2',2'-dimethyl-3'-methylsulfinylpropionate), m.p. 210°–206° (ethyl acetate-cyclohexane); mass spectrum calcd. for $C_{28}H_{37}F_3SO_7$ : 574.2212, found 574.2245.

In like manner, any 6α-fluoro-21-hydroxycorticosteroid of Table I, above, can be contacted with an acid chloride or anhydride prepared from any sulfide-acid of Table III or from a cyclic sulfide-acid, such as 4-thiacyclohexane-1-carboxylic acid, 3-thiacyclopentane-1-carboxylic acid, 2-(4-thiacyclohexyl)acetic acid, and 2-(3-thiacyclopentyl)acetic acid, to give the corresponding C—21 sulfide-acid ester. Each such ester can be contacted with one equivalent of a mild oxidant to give the corresponding C-21 alkylsulfinyl ester.

Employing the general conditions of Examples 1-4, 6,6,9α-trifluoro-11β,16α,17α,21-tetrahydroxy-1,4-pregnadiene-3,20-dione 16,17-acetonide can thus be esterified with 2,2-dimethyl-3-methylthiopropionyl chloride to the corresponding 2',2'-dimethyl-3'-methylthiopropionyl ester, which can be oxidized to 6,6,9α-trifluoro-11β,16α,17α,21-tetrahydroxy-1,4-pregnadiene-3,20-dione 16,17-acetonide 21-(2,2'- dimethyl-3'-methylsulfinylpropionate). Similarly, 6,6-difluoro-11β,-17α,21-trihydroxy-4-pregnene-3,20-dione 21-(2',2'-dimethyl-3'-methylsulfinylpropionate) can be prepared from 6,6-di-fluoro-11β,17α,21-trihydroxy-4-pregnene-3,20-dione.

The products of Examples 1–4 were tested on rats for both topical and systemic antiinflammatory activity and all were found to be active in the bioassays. The thymolytic activity of these novel corticosteroid esters also was determined since a high thymolytic activity is undesirable. Some thymolysis usually can be expected in all cases with corticosteroid compounds.

A carrageenin-induced rat paw inflammation assay was used for the evaluation of systemic activity. Intact male rats weighing 65–70 g. received the test material injected in 0.5 ml. carboxymethylcellulose solution for two days. On the morning of the third day (at hour 0) a third injection of the test material was given. The total dose of the test compound was 0.001–3.2 mg. per animal per day. At hour 1, 0.05 ml. of a 1 percent solution of carrageenin in 0.9 percent aqueous sodium chloride was injected into the right hind paw, causing inflammation of the paw. The rats were sacrificed at hour 4, at which time both hind paws were removed and weighed separately. Thymus gland also was removed and weighed.

In the topical antiinflammatory assay, intact male rats 21 days old were anesthetized, and a solution consisting of test compound in 1 percent croton oil, 20 percent pyridine, 5 percent distilled water and 74 percent diethyl ether was inuncted 0.05 ml. to the inside of the left ear and 0.05 ml. to the outside of the left ear. The total dose of the test compound was 0.1–2.7 μg per animal per day. Ears were removed six hours after the administration of the compound and pieces of uniform size were punched out with a No. 4 cork borer. The ear pieces were then weighed.

The test compounds were found to have not only a good topical and systemic antiinflammatory activity but also a low thymolytic activity. They thus appear to be particularly well suited for use as antiinflammatory agents. The C-21 lower alkylsulfinyl esters of 6α-fluoro-21-hydroxycorticosteroids are useful as orally, parenterally, or topically applied antiinflammatory agents. They can be administered orally in solid state, e.g., as pills, tablets, or powders (free or encapsulated), or as liquids, in the form of solutions, suspensions, or syrups. Topically they can be administered as creams, ointments, solutions, suspensions, foams, aerosols, or powder, or from coatings on films or tapes, mixed, if desired, with pharmaceutically acceptable inert vehicle or combinations of inert vehicles. Parenterally, they can be injected as suspensions or solutions in pharmaceutically acceptable oils or aqueous media. Orally, topically, or parenterally, the novel esters of this invention can be administered alone or in combination with pharmaceutically active agents, such as antibiotics or analgesics.

The embodiments of the invention in which an exclusive property or privilege is claimed are defined as follows:

1. An ester having antiinflammatory activity and represented by the formula

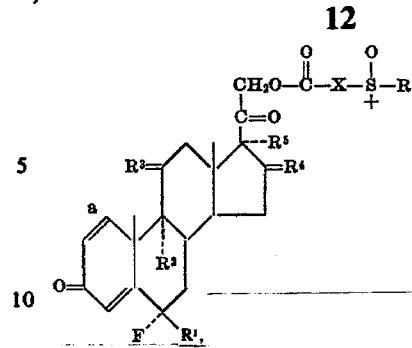

in which $a$ is either a single or a double bond;
$R^1$ is hydrogen or fluorine;
$R^2$ is hydrogen, chlorine, or fluorine;
$R^3$ is oxygen, one α-hydrogen and one β-hydroxyl, or one α-hydrogen and one β-chlorine;
$R^4$ is two hydrogens, one hydrogen and one methyl, one hydrogen and one hydroxyl, or one hydrogen and one acetoxyl;
$R^5$ is hydroxyl; but
$R^4$ and $R^5$ together can form the group

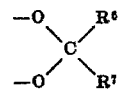

in which
each of $R^6$ and $R^7$ is an alkyl of one to six carbon atoms;
a cycloalkyl of five to six carbon atoms, or phenyl;
or $R^6$ and $R^7$ together are an alkylene of four to five carbon atoms;
X is a divalent hydrocarbon radical of up to ten carbon atoms; and R is an alkyl of one to four carbon atoms; with the proviso that X and R together can form a cyclic structure.

2. A steroid of claim 1, in which $R^4$ and $R^5$ together form the group

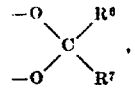

in which each of $R^6$ and $R^7$ is methyl.

3. 6,6-Difluoro-16α-methyl-11β,17α,21-trihydroxy-1,4-pregnadiene-1,20-dione 21-(3'-methylsulfinylpropionate), the compound of claim 1 in which $a$ is a double bond; $R^1$ is fluorine; $R^2$ is hydrogen; $R^3$ is one hydroxyl and one hydrogen; $R^4$ is two hydrogens; $R^5$ is hydroxyl; X is the ethylene radical; and R is methyl.

4. 6,6,9α-Trifluoro-16α-methyl-11β,17α,21-trihydroxy-1,4-pregnadien-3,20-dione 21-(2',2'-dimethyl-3'-methylsulfinylpropionate), the compound of claim 1 in which $a$ is a double bond; $R^1$ and $R^2$ are fluorine atoms; $R^3$ is one hydroxyl and one hydrogen; $R^4$ is one hydrogen and one methyl; $R^5$ is hydroxyl; X is the 2-methyl-1,2-propylene radical; and R is methyl.

5. 6,6-Difluoro-11β,17α,21-trihydroxy-4-pregnene-3,20-dione 21-(2',2'-dimethyl-3'-methylsulfinylpropionate), the compound of claim 1 in which $a$ is a single bond; $R^1$ is fluorine; $R^2$ is hydrogen; $R^3$ is one hydrogen and one hydroxyl; $R^4$ is two hydrogens; $R^5$ is hydroxyl; X is the 2-methyl-1,2-propylene radical; and R is methyl.

6. 6α-Fluoro-11β,16α,17α,21-tetrahydroxy-4-pregnene-3,20-dione 16,17-acetonide 21-(2',2'-dimethyl-3'-methylsulfinylpropionate), the compound of claim 2 in which $a$ is a single bond; $R^1$ and $R^2$ are hydrogen atoms; $R^3$ is one hydrogen and one hydroxyl; X is the 2-methyl-1,2-propylene radical; and R is methyl.

7. 6α-Fluoro-11β,16α,17α,21-tetrahydroxy-4-pregnene-3,20-dione 16,17-acetonide 21-(3'-methylsulfinyl-propionate), the compound of claim 2 in which $a$ is a single bond; $R^1$ and $R^2$ are hydrogen atoms; $R^3$ is one hydroxyl and one hydrogen; X is the ethylene radical; and R is methyl.

8. 6,6,9α-Trifluoro-11β,16α,17α,21-tetrahydroxy-1,4-pregnadiene-3,20-dione 16,17-acetonide 21-(2',2'-di-methylsulfinylpropionate), the compound of claim 2 in which $a$ is a double bond; $R^1$ and $R^2$ are fluorine atoms; $R^3$ is one hydroxyl and one hydrogen; X is the 2-methyl-1,2-propylene radical; and R is methyl.

9. A process for preparing an ester of claim 1 consisting in:
  a. contacting a 6α-fluoro-21-hydroxy-20-ketopregnane with a chloride or anhydride of a sulfide-acid of the formula

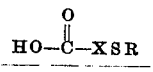

where X and R are as defined in claim 1 at a temperature of about −30° to +30°C. to produce a C—21 sulfide-acid ester; and
  b. oxidizing the said C—21 sulfide-acid ester by contacting it at a temperature of −20° to +25°C. with a mild oxidant of the group oxides of nitrogen, hydrogen peroxide, a carboxylic peroxy-acid, sodium bromate, and sodium periodate.

10. The process of claim 9 in which step (a) is carried out with a sulfide-acid chloride in the presence of a tertiary amine at a temperature of about −30° to +10° C.

11. The process of claim 10 in which the tertiary amine is pyridine.

12. The process of claim 10 in which the step (b) is carried out with m-chloroperbenzoic acid as the oxidizing agent.

* * * * *